United States Patent
Bush, Sr.

(10) Patent No.: US 6,890,020 B2
(45) Date of Patent: May 10, 2005

(54) TRAILER PARTICULARLY SUITED TO HAULING CRUSHED AND FLATTENED VEHICLES

(75) Inventor: Charles Bush, Sr., Rochester Hills, MI (US)

(73) Assignee: Benlee, Inc., Romulus, MI (US)

( * ) Notice: Subject to any disclaimer, the term of this patent is extended or adjusted under 35 U.S.C. 154(b) by 0 days.

(21) Appl. No.: 10/304,417

(22) Filed: Nov. 26, 2002

(65) Prior Publication Data

US 2004/0201249 A1 Oct. 14, 2004

(51) Int. Cl.[7] .............................. B60J 5/06; B62D 33/04
(52) U.S. Cl. ................................. 296/186.4; 296/186.2
(58) Field of Search ................................. 296/181, 182, 296/183, 100.1, 100.06, 100.12, 100.14, 100.11, 100.18, 100.17, 100.02, 100.08, 100.09, 100.01, 186.4, 182.1, 36, 185, 186.1, 186.2, 183.1, 155

(56) References Cited

U.S. PATENT DOCUMENTS

| | | | | |
|---|---|---|---|---|
| 4,140,339 A | * | 2/1979 | Fredin | 296/100.17 |
| 4,268,084 A | * | 5/1981 | Peters | 296/148 |
| 4,302,044 A | * | 11/1981 | Sims | 296/183 |
| 4,489,975 A | * | 12/1984 | Fredin | 296/181 |
| 4,682,811 A | * | 7/1987 | Ooguro | 296/181 |
| 4,987,942 A | * | 1/1991 | Eriksson | 160/243 |
| 5,176,388 A | * | 1/1993 | Horton | 296/181 |
| 5,466,030 A | * | 11/1995 | Harris et al. | 296/181 |
| 5,599,058 A | * | 2/1997 | Carter et al. | 296/181 |
| 5,876,164 A | | 3/1999 | Hamelin et al. | |
| 5,911,467 A | * | 6/1999 | Evans et al. | 296/181 |
| 6,079,762 A | * | 6/2000 | Strasser | 296/36 |
| 6,174,022 B1 | * | 1/2001 | Ashcroft | 296/181 |
| 6,227,608 B1 | * | 5/2001 | Hoyne | 296/184 |

* cited by examiner

*Primary Examiner*—D. Glenn Dayoan
*Assistant Examiner*—Greg Blankenship
(74) *Attorney, Agent, or Firm*—Gifford, Krass, Groh, Sprinkle, Anderson & Citkowski, PC

(57) ABSTRACT

A hauling trailer particularly suited to the transport of scrap such as crushed and flattened vehicles includes a floor with walls and one open side, and a retractable wall structure for closing off the open side during transport. The wall structure, which may be flexible, rigid, or partitioned, is preferably retracted by raising and lowering a barrier from a member supported above the open side. To provide greater access to the open side during loading, a separate mechanism is provided for raising and lowering the member independent of the wall structure. The member may, for example, form part of a generally c-shaped lid structure, with the separate mechanism moving the lid structure between a lowered and raised position.

14 Claims, 3 Drawing Sheets

TRAILER PARTICULARLY SUITED TO HAULING CRUSHED AND FLATTENED VEHICLES

FIELD OF THE INVENTION

This invention relates generally to waste and scrap hauling and, in particular, to a trailer with four sides, at least one of which opens to receive scrap including crushed/flattened vehicles.

BACKGROUND OF THE INVENTION

The recycling of wrecked cars now represents a substantial business. Such vehicles are first stripped of non-metal parts and hazardous materials, then crushed or flattened to consume less space during transport to a recycling station where they are chipped into small pieces. The small pieces are then sold to be melted down.

Standard flatbed trailers are commonly used to transport the crushed or flattened vehicles. The flattened vehicles are typically loaded on the flatbed in stacks using a fork-lift, and each stack is secured with tie-down chains.

There are disadvantages associated with the use of flatbed trailers, however. For one, when the wrecked vehicles are crushed or flattened, stress is put on various parts such as mirrors and moldings that may become dislodged or loose in transit, resulting in dangerous debris on the highway. Another disadvantage is that if the load has shifted, adjustments should be made to the tie-downs, which are difficult to inspect and secure. Manipulating the chains across the stacks can be unsafe, as the stacks of vehicles are unstable and are prone to slip or tip over.

Various alternative trailers are used to overcome these disadvantages. A common approach is the use of a three-sided trailer of the type disclosed, for example, in U.S. Pat. No. 5,599,058. A twelve-inch high retainer wall of solid sheet steel is also provided on the three walled sides around the bottom periphery to prevent any small pieces of debris from falling off the trailer bed on those sides. The open side of the trailer is located on the side of the transport vehicle that will be toward the berm of the road, so that any debris falling in that direction will fall to the side of the road.

In accordance with U.S. Pat. No. 5,876,164, there is provided a device for carrying car frames or the like, comprising a rectangular base member comprising at least one trailer bed, and means for mounting said base member on wheels. Transverse members are spacedly mounted on the base member and a first vertical protection wall is mounted at a front end of the base member. A second vertical protection wall is mounted on one longitudinal side of the base member, the other longitudinal side being free of vertical protection wall, and a third vertical protection wall is mounted at a rear end of the base member. Support means extend vertically from the transverse member and are aligned along a straight line spaced at an equal distance from the second protection wall. A non-slip member is disposed along the other longitudinal side of the base member, and means for securing a load of car frames are stacked on the transverse members between the support means and the non-slip members.

In accordance with a preferred embodiment, the base member comprises a front trailer bed and a rear trailer bed, the rear trailer bed being articulated to the front trailer bed, the first vertical protection wall being mounted at the front of the front trailer bed, the third vertical protection wall being mounted at the rear of the rear trailer bed, the second vertical protection wall being mounted on the longitudinal left sides of both front and rear trailer beds.

Despite advances of the type described above, the need remains for a trailer with a fourth side that opens and closes. In the United States, this need has increased in urgency due to a recently enacted law requiring that all four sides of car frame haulers be enclosed at least up to the level of the load.

SUMMARY OF THE INVENTION

This invention resides in a hauling trailer, particularly of the type used to transport scrap such as crushed and flattened vehicles. A trailer according to the invention broadly includes a floor with walls and one open side, and a retractable wall structure for closing off the open side during transport. In the preferred embodiments, one or more hydraulic cylinders are used for retracting the wall structure, which may be flexible, rigid, or partitioned. In the preferred embodiment, the wall structure is retracted by raising and lowering a barrier from a member supported above the open side. To provide greater access to the open side during loading, a separate mechanism is provided for raising and lowering the member independent of the wall structure.

In the preferred embodiment, a set of permanent, rigid or semi-rigid front, back and side walls extend up from the floor creating a c-shaped upper edge having two corners and two ends, with the member spanning the two ends. Retraction is accomplished by moving the barrier between an open position, wherein the bottom edge of the barrier is away from the floor, and a closed position, wherein the bottom edge of the barrier is adjacent the floor.

To raise and lower the member independent of the wall structure, the member forms part of a lid structure, and the separate mechanism moves the lid structure between a lowered position, wherein the member spans the two upper ends of the open side, and a raised position wherein the member is lifted up and away from the open side. In one disclosed example, the lid structure is generally c-shaped with two corners and two ends, with the member connecting the two corners of the lid structure and the two ends of the lid structure being hingedly affixed to the two corners of the upper edge. The central section of the lid structure may be closed or opened to permit loading/loading with the lid structure in the lowered position with the open side sealed off.

Yet a further mechanism may be provided for clamping the side edges of the barrier against the edges of the front and back walls when the barrier is in the closed position. Such mechanisms are preferable hydraulically controlled, though pneumatic or electrical devices may alternatively be utilized.

DETAILED DESCRIPTION OF THE INVENTION

Figure 1:
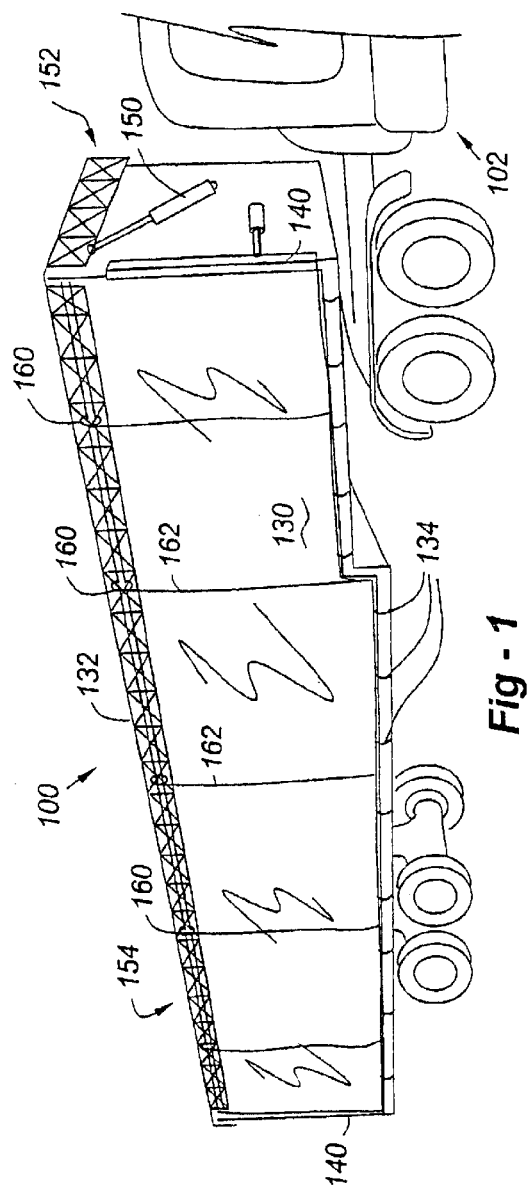
FIG. 1 is a simplified perspective view of the preferred embodiment according to the invention.

Now turning to the drawings, FIG. 1 is a simplified, perspective view of a preferred embodiment of the invention, depicted generally at 100. The trailer 100 is pulled by a tractor 102 of any conventional design, utilizing any attachment mechanism such as a king-pin plate, as appropriate.

Figure 2:
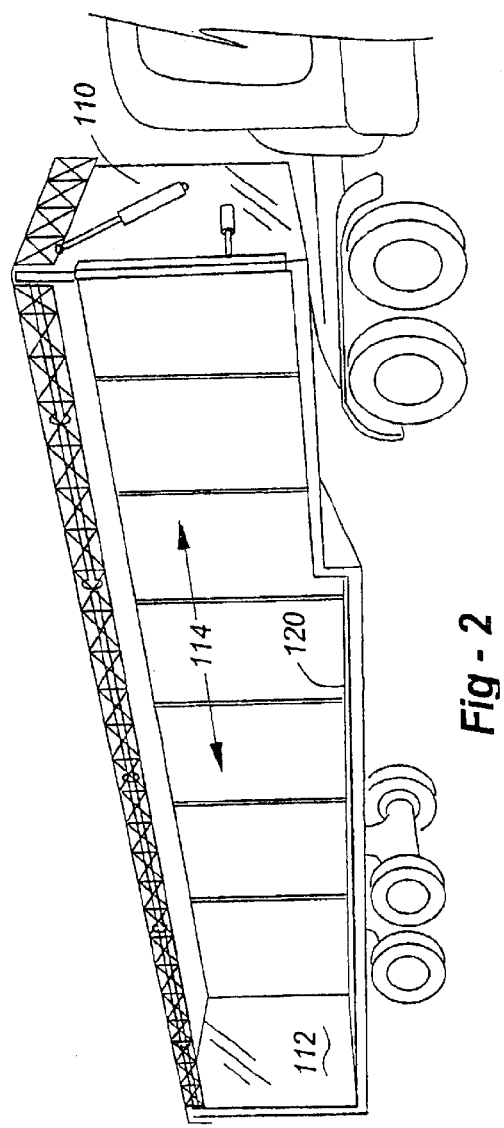
FIG. 2 depicts the embodiment of FIG. 1 with the barrier removed.

In the preferred embodiment, the trailer 100 includes a front wall 110, a rear wall 112, and a side wall 114, extending up from a floor 120, as perhaps best seen in FIG. 2. This leaves an open side along the length of a trailer, which this invention opens and closes for loading/unloading and transport, respectively.

In the preferred embodiment, the wall structure used to close the open side comprises a barrier material 130, as seen in FIG. 1, which drapes down from a lid structure 132. In the transport condition, shown in FIG. 1, the barrier 130 is tied at appropriate points 134 along the floor of the trailer. Any appropriate tie-down mechanism may be used for such purpose. Optionally, hydraulically operated clamps 140 are used at front and rear to hold the edges of the barrier 130 against the edges of the walls 110 and 112 to prevent wind disturbances during travel.

The lid structure 132 in this embodiment is opened and closed using front and rear hydraulic cylinders, only the forward one of which is visible at 150. The lid structure 132 is hinged at points 152 and 154, and is preferably constructed utilizing relatively lightweight cross-bracing as opposed to more heavy solid structures.

Associated with the lid structure 132 are a series of rotatably driven wheels 160, each coupled to straps 162, such that by rotation thereof, the barrier 130 may be raised and lowered.

Figure 3:
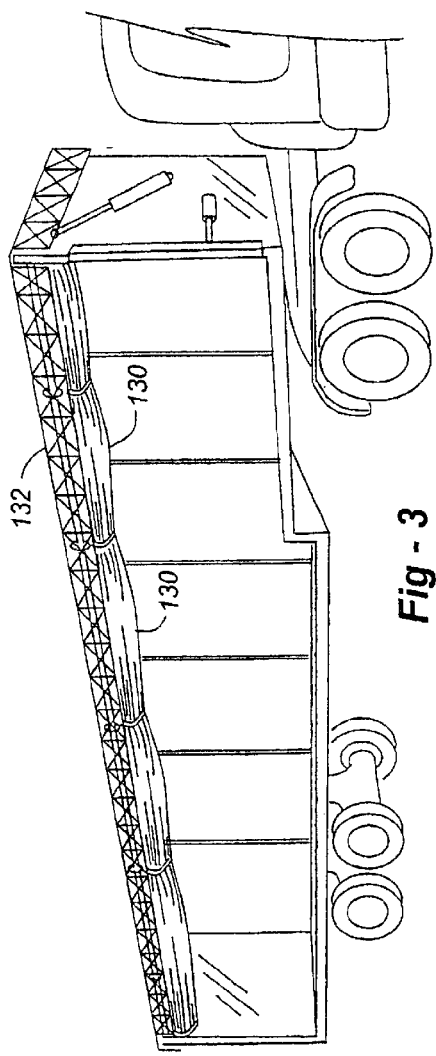
FIG. 3 shows the embodiment of FIG. 1 with the barrier in a raised position.
Figure 4:
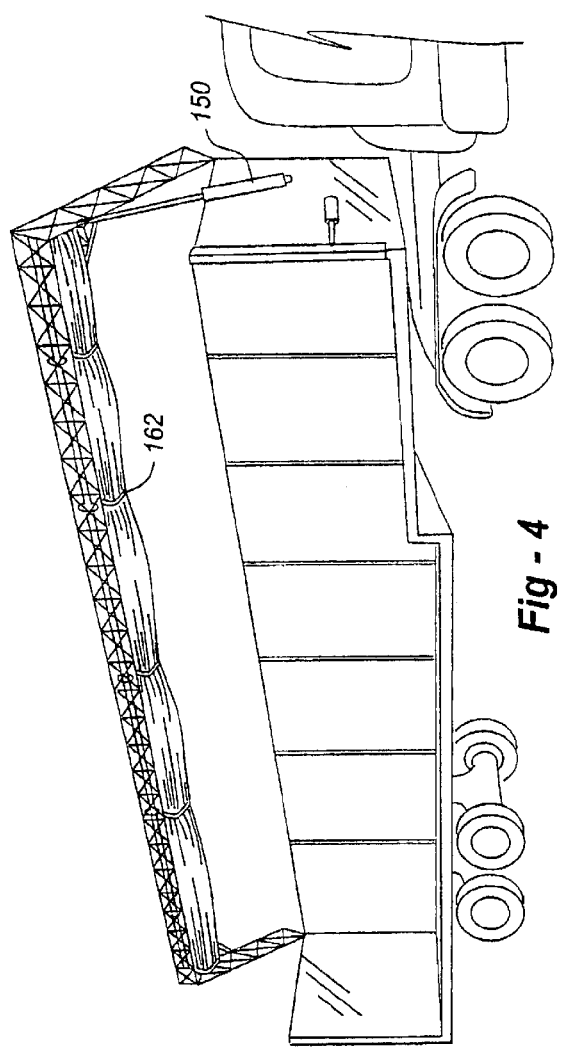
FIG. 4 is a drawing which shows how the barrier is preferably further raised through the use of a retractable lid structure.

The raised condition is depicted in FIG. 3, wherein the barrier material 130 has been drawn up and is now in closer proximity to the lid structure 132. While the condition shown in FIG. 3 may be useful for some loading purposes, in the preferred embodiment, the front and rear hydraulic cylinders 150 are instead extended to raise the lid structure higher above the open side, thereby permitting scrap in the form of crushed and flattened vehicles, and the like, to be loaded by forklift through the open side without any interference with the wall structure in general or barrier material in particular. The raising the of the barrier material 130 using rotatably driven straps 162 may occur before or during the raising of the lid structure.

Figure 5:
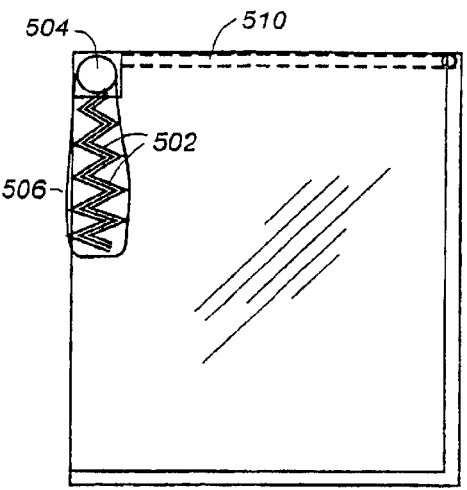
FIG. 5 is a simplified cross-section of an alternative embodiment of the invention, illustrating how hinged panels may be used in lieu of a flexible barrier material.

Although, in the preferred embodiment, a flexible material such as a tarpaulin or vinyl sheet is used as the barrier material, hinged panels or even large solid panels may be used instead, as will now be described. In FIG. 5, for example, a plurality of hinged panels 502 may be used raised and lower using a pulley 504 coupled to a strap 506 much like the design utilizing a flexible sheet material for the barrier. In addition, although, in the preferred embodiment, a lid structure is used to bring the retracted barrier material that much higher than the open side, this is actually not necessary to each embodiment of the invention, in the sense that the mechanism used to raise and lower the barrier may simply permanently span the top edge of the open side.

Figure 6:
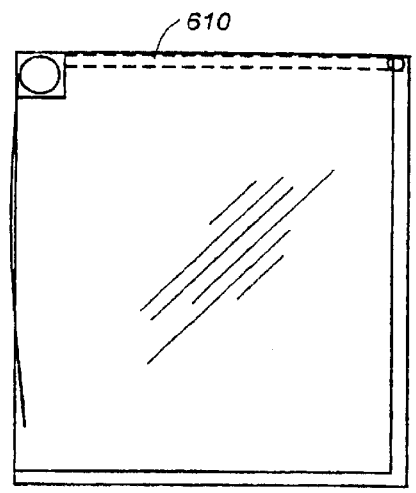
FIG. 6 is a simplified cross-section illustrating the way in which a rolled barrier sheet may be used with or without a lid structure.

Accordingly, this is depicted with broken lines 510 and 610 in FIGS. 5 and 6. FIG. 6 also shows how the barrier material may itself simply be rolled onto an elongated roller without the use of straps. As with the embodiments set forth above, either a flexible sheet material or hinged or partitions may be used for such purpose.

Figure 7:
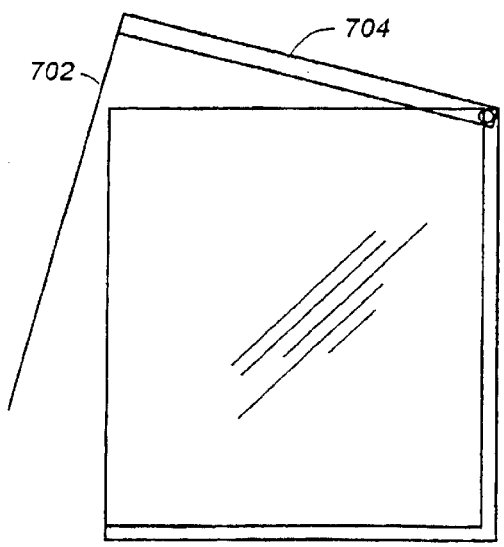
FIG. 7 shows how a substantially solid and/or rigid barrier may be used.
Figure 8:
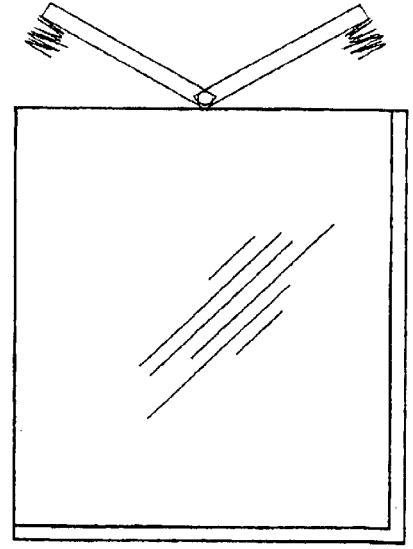
FIG. 8 shows the way in which two opposing sides may be simultaneously opened through the use of a gullwing-type mechanism.

FIG. 7 illustrates the way in which a substantially solid walls structure 702 in conjunction with a hinged lid 704. FIG. 8 shows the way in which a gullwing design located more or less centrally down the length of the trailer may be used to open up barriers on both sides, thereby enabling loading/unloading from different directions. A disadvantage of the design of FIG. 8 is that it makes it more difficult to remove the contents of the trailer using a grappling hook, as is now the case. Nevertheless, all of the embodiments herein may further include a top cover, either permanently, semi-permanently or retractably affixed to the open top of the trailer, whether or not a lid structure is utilizing.

I claim:

1. A hauling trailer, comprising:

floor with wheels thereunder;

front, back and side walls extending up from the floor creating a c-shaped upper edge having two corners and two ends;

a member spanning the two ends;

a barrier composed of two or more hinged panels extending down from the member, the barrier having a bottom edge and two sides edges; and a mechanism for moving the barrier between an open position, wherein the hinged panels are rolled up or drawn upwardly in accordion-like fashion, such that the bottom edge of the barrier is away from the floor, and a closed position, wherein the bottom edge of the barrier is adjacent the floor.

2. The trailer of claim 1, wherein the mechanism is operative to raise and lower the barrier with respect to the member.

3. The trailer of claim 1, wherein:

the member forms part of a lid structure; and further including a mechanism for moving the lid structure between a lowered position wherein the member spans the two ends of the upper edge, and a raised position wherein the member is lifted up and away from the two ends.

4. The trailer of claim 2, wherein the lid structure has an open central section facilitating loading and unloading from above with the lid structure in the lowered position.

5. The trailer of claim 2, further including a sheet of material to close off the lid structure.

6. The trailer of claim 2, wherein the lid structure is generally c-shaped with two corners and two ends, with the member connecting the two corners of the lid structure and the two ends of the lid structure being hingedly affixed to the two corners of the upper edge.

7. The trailer of claim 1, wherein:

the front and back wall define vertical, parallel, spaced-apart edges extending from the floor to the two ends of the upper edge; and further including a mechanism for clamping the side edge of the barrier against the edges of the front and back walls when the barrier is in the closed position.

8. The trailer of claim 1, wherein:

one or more of the front, back and side walls are also moveable between an open and a closed position.

9. A hauling trailer, comprising:

a floor with wheels thereunder;

a set of permanent and rigid front, back and side walls extending up from the floor leaving one side open;

a retractable wall structure for closing off the open side during transport, including a member supported above the open side, and a mechanism along the member for retracting the wall structure through raising and lowering; and a separate mechanism for raising and lowering the member independent of the wall structure.

10. A hauling trailer, comprising:

a floor with wheels thereunder;

front, back and side walls extending up from the floor creating a c-shaped upper edge having two corners and two ends;

a member forming part of a lid structure spanning the two ends;

a barrier extending down from the member, the barrier having a bottom edge and two sides edges; and a mechanism for moving the barrier between an open position, wherein the bottom edge of the barrier is away from the floor, and a closed position, wherein the bottom edge of the barrier is adjacent the floor; and a mechanism for moving the lid structure between a lowered position wherein the member spans the two ends of the upper edge, and a raised position wherein the member is lifted up and away from the two ends.

11. The trailer of claim 10, wherein the lid structure has an open central section facilitating loading and unloading from above with the lid structure in the lowered position.

12. The trailer of claim 10, including a sheet of material to close off the lid structure.

13. The trailer of claim 10, wherein the lid structure is generally c-shaped with two corners and two ends, with the member connecting the two corners of the lid structure and the two ends of the lid structure being hingedly affixed to the two corners of the upper edge.

14. The trailer of claim 10, wherein the barrier is a tarpaulin.

* * * * *